United States Patent [19]

Hernández-Badillo

[11] Patent Number: 4,559,462

[45] Date of Patent: Dec. 17, 1985

[54] DYNAMO-ELECTRIC CYCLE AXLE

[76] Inventor: Wilfredo Hernández-Badillo, Cuesta Vieja #43, Aguadilla, P.R. 00603

[21] Appl. No.: 615,468

[22] Filed: May 30, 1984

[51] Int. Cl.[4] .............................................. H02K 7/08
[52] U.S. Cl. ............................... 310/67 A; 301/105 B; 310/90; 310/156; 384/545
[58] Field of Search ...................... 310/67 A, 67 R, 90, 310/156; 301/105 B; 384/545; 308/192; 180/65.5

[56] References Cited

U.S. PATENT DOCUMENTS

| 1,414,270 | 4/1922 | Fry ........................................ 384/545 |
| 2,104,707 | 1/1938 | Rawlings ....................... 310/67 A X |
| 2,511,489 | 6/1950 | Woermbke ....................... 310/67 A |

FOREIGN PATENT DOCUMENTS

| 39046 | 7/1928 | Denmark ............................. 384/545 |
| 624308 | 2/1934 | Fed. Rep. of Germany ... 310/67 A |
| 824618 | 2/1938 | France ................................ 384/545 |
| 455458 | 3/1950 | Italy ................................ 310/67 A |
| 501914 | 11/1954 | Italy ................................ 310/67 A |
| 524440 | 4/1955 | Italy ................................ 301/105 B |
| 209792 | 4/1940 | Switzerland ...................... 310/67 A |

Primary Examiner—Robert G. Nilson
Attorney, Agent, or Firm—Richard L. Miller

[57] ABSTRACT

A dynamo-electric cycle axle which resides inside an axle of a bicycle, motorcycle, wheelchair, etc. An axle cylinder with curved permanent magnets mounted to its inner periphery serves as a rotor. A stator, rotating on ball bearings, generates electricity which is conducted to various accessories by a unique arrangement which allows the positive lead of an accessory to be plugged directly into the invention. The entire assembly is resistant to environmental hazards such as precipitation and salt spray. Easy lubrication injection for the ball bearings is provided.

4 Claims, 5 Drawing Figures

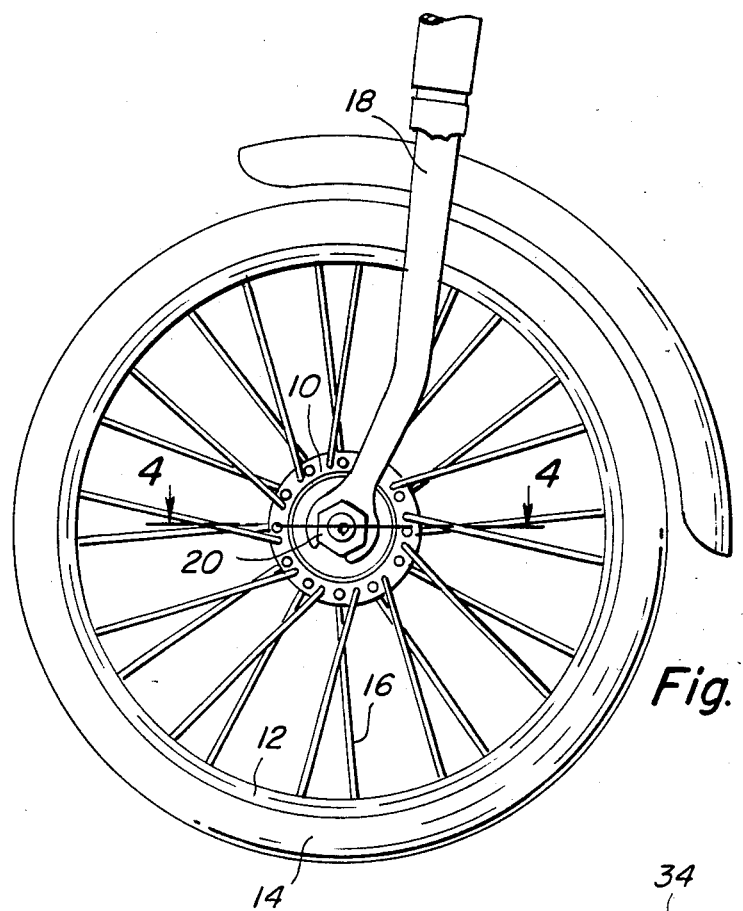
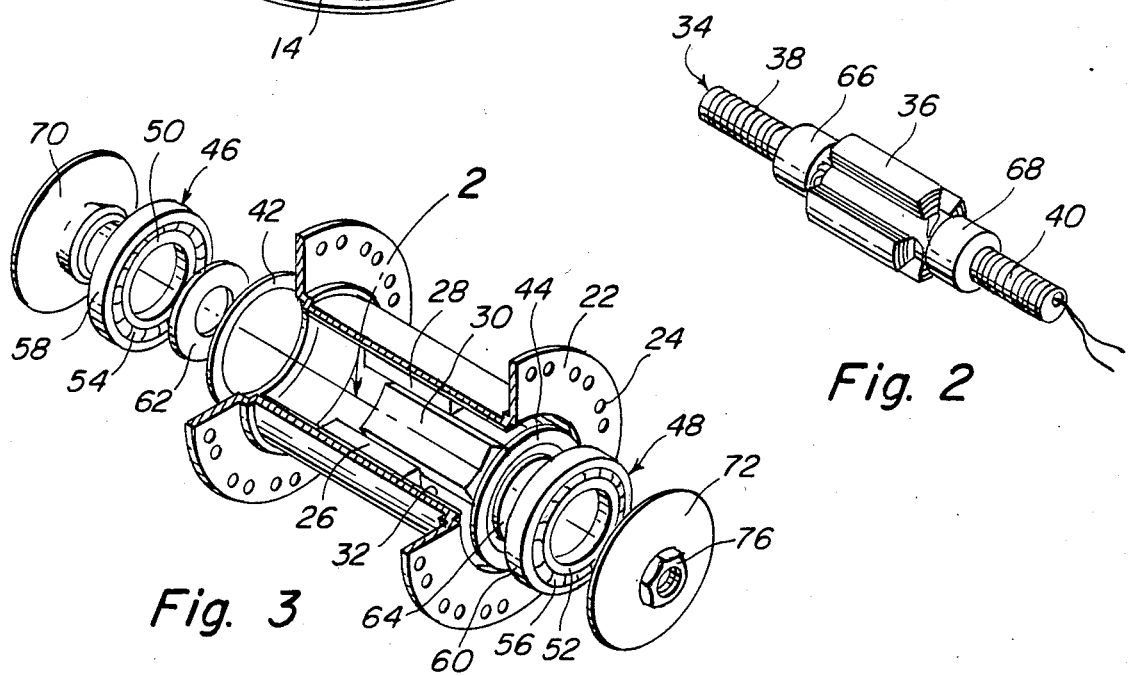

DYNAMO-ELECTRIC CYCLE AXLE

BACKGROUND OF THE INVENTION

The present invention relates generally to systems for generating electrical energy and, more specifically, to generating systems used on bicycles and motorcycles.

At the present state of the art generators are external devices subject to environmental conditions such as rain, snow, hail, salt spray, etc. In typical bicycle applications generators are placed close to the rim of the front bicycle wheel and a friction drive is used which contacts the rotating rim and supplies rotational energy to the generator. This external generator is often bolted to the bicycle fork with steel bands and normal usage frequently bends these bands out of alignment. External generators are also subject to vandalism and theft. Typical patents which suffer with these problems and are not as suitable for the purpose intended as the instant invention are: U.S. Pat. Nos. 4,021,690; 4,346,777; and 4,061,200.

Recent attempts to integrate the generator to the bicycle axle have proved ineffective and do not serve the purpose of the present invention.

SUMMARY OF THE INVENTION

It is, therefore, a primary object of the present invention to provide a dynamo-electric cycle axle which is an integral part of the front wheel axle.

Another object is to provide a dynamo-electric cycle axle which is resists environmental stresses such as precipitation and salt spray.

A further object is to provide a dynamo-electric cycle axle which uses ball bearing to reduce friction losses.

A still further object is to provide a dynamo-electric cycle axle which may be easily lubricated.

A still further object is to provide a dynamo-electric cycle axle which can easily replace any existing front axle assembly.

Another still further object is to provide a dynamo-electric cycle axle to which any electrically driven accessory may be easily connected by use of a simple plug and socket arrangement.

Further objects of the invention will appear as the description proceeds.

To the accomplishment of the above and related objects, this invention may be embodied in the form illustrated in the accompanying drawings, attention being called to the fact, however, that the drawings are illustrative only and that changes may be made in the specific construction illustrated and described within the scope of the appended claims.

BRIEF DESCRIPTION OF THE DRAWING FIGURES

The figures in the drawings are briefly described as follows:

FIG. 1 is a side elevational view of a typical bicycle wheel with the invention installed thereon.

FIG. 2 is an isometric view showing the armature construction of the invention.

FIG. 3 is an exploded isometric view of the hub construction of the invention.

DETAILED DESCRIPTION OF THE PREFERRED EMBODIMENTS

Figure 4:
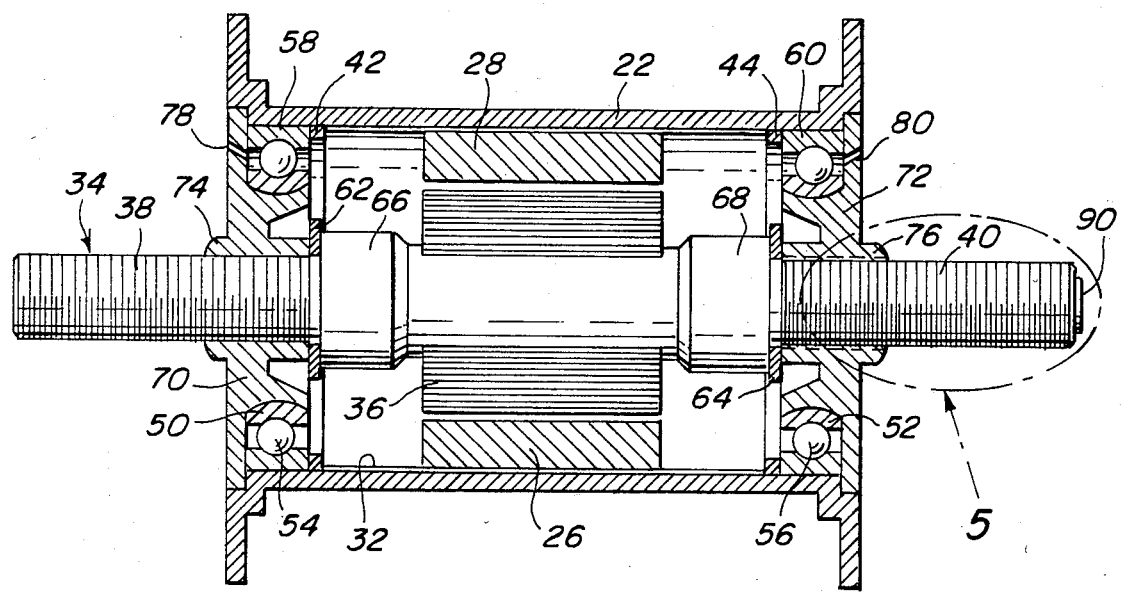
FIG. 4 is a cross sectional view taken along with axis of rotation in FIG. 3.

In FIG. 1, the invention 10 is shown installed onto a wheel 12 with mounted tire 14. The wheel 12 is mounted to the invention 10 by spokes typified by 16. The invention 10 is mounted, in turn, to bicycle fork 18 by tire nut 20.

The construction details of the invention 10 may best be understood with reference to FIGS. 2, 3 and 4. The main construct support and enclosure is the axle cylinder 22 which has a large number of spoke apertures typified by 24. The inner cylindrical surface of axle cylinder 22 contains curved permanent magnets, three of which are visible as numerals 26, 28 and 30 which together form the rotor of a generator. A protective mica sheet 32 isolates the magnets from the axle cylinder. A stator 34 is supplied with induction coil set 36 which generates a voltage when rotated relative to the stator. A negative axle 38 is threaded to mate with the internal thread on tire nut 20 in order to mount the invention 10 to the fork 18. A positive axle 40 is similarly provided. To assemble the stator 34 to the axle cylinder 22, the following assembly order is followed: First, the stator 34 is placed, roughly centered, into axle cylinder 22. Rings 42 and 44 are pressed into place which will limit the travel of ball bearing assemblies 46 and 48 when they are inserted. Each ball bearing assembly consists of inner cups 50 and 52, ball bearing typified by 54 and 56 and ball retainers 58 and 60. Before ball bearing assemblies 46 and 48 are installed flat washers 62 and 64 are placed over axles 38 and 40 respectively thereby distributing stresses throughout each of the ball bearing assemblies. Stator assembly 34 is provided with two end cylinders 66 and 68 which rest against flat washers 62 and 64 respectively as part of the stress reducing feature. Finally, lid nuts 70 and 72 are threaded onto axles 38 and 40 respectively. Each of lid nuts 70 and 72 are provided with adjustment nuts 74 and 76 respectively which may be loosened or tightened with a wrench to center stator 34 in axle cylinder 22 and to provide the correct tension to ball bearing assemblies 46 and 48. Lubrication apertures 78 and 80 are provided in lid nuts 70 and 72 respectively, in order to lubricate ball bearing assemblies 46 and 48 respectively.

Figure 5:
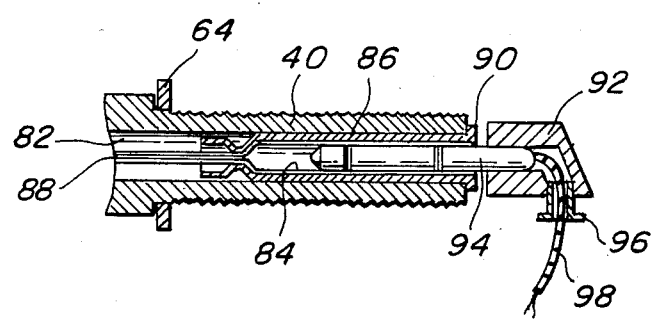
FIG. 5 is a partial enlarged cross sectional view showing the internal construction details of the axle shown in FIG. 4.

The technique for conducting an electrical signal from induction coil set 36 to external accessories may best be understood with reference to FIGS. 4 and 5. The negative lead from induction coil set 36 is grounded to bicycle fork 18 through direct connection to negative axle 38. The connection of the positive signal is via positive axle 40 which is hollow at 82. A conducting sleeve 84, with protective insulating lip 90, fits snugly inside an insulating sleeve 86. Positive lead 88 is connected to conducting sleeve 84. An accessory plug 92, with male member 94 is plugged into conducting sleeve 84. A strain relief cap 96 prevents positive output wire 98 from becoming dislodged.

While certain novel features of this invention have been shown and described and are pointed out in the annexed claims, it will be understood that various omissions, substitutions and changes in the forms and details of the device illustrated and in its operation can be made by those skilled in the art without departing from the spirit of the invention.

What is claimed is:

1. A dynamo-electric cycle axle for positioning within the hub of a wheel, comprising in combination:
   (a) an elongated axle cylinder together with a multiplicity of curved permanent magnets longitudinally centered along the inner periphery of said axle cylinder thereby forming a generator rotor;
   (b) a stator coaxially positioned within said axle cylinder, containing an induction coil set and two threaded axles on either side, wherein said rotor rotates relative to said stator thereby forming a voltage generator;
   (c) means for conducting electrical energy from said induction coil set to a fixed contact and conductor;
   (d) two ball bearing assemblies each constructed of a cylindrical inner cup, a multiplicity of ball bearings and a ball retainer, wherein one ball bearing assembly is coaxially placed on each of said axles;
   (e) two circular rings selectively insertable into each end of said central cylinder at a desired depth to respectively limit the inward ingress of said ball bearing assemblies to a desired depth;
   (f) lid nuts with inner threads which thread onto mating threads on said axles, wherein said lid nuts secure said ball bearing assemblies in place and wherein said lid nuts are stationary with respect to said axles and movable with respect to said ball bearing assemblies;
   (g) adjustment nuts integral to said lid nuts and located axially on the outside surface of said lid nuts;
   (h) two end cylinders placed laterally on either side of said induction set, and a washer disposed between each end cylinder and the adjustment lid nut, the outer diameters of said end cylinders and said washers being less than the inner diameter of said circular rings, whereby adjusting each of said adjustments nuts can axially shift said stator to center said induction coil set with respect to said magnets and also distribute biasing stresses upon said ball bearing assemblies.

2. A dynamo-electric cycle axle, as recited in claim 1, wherein said axle cylinder has a multiplicity of spoke apertures.

3. A dynamo-electric cycle axle, as recited in claim 1, further comprising lid nuts with lubricating apertures whereby a lubricant may be injected into said ball bearing assemblies.

4. A dynamo-electric cycle axle, as recited in claim 1, wherein said means for conducting electrical energy from said induction coil set to a fixed contact and conductor comprises a ground connection from the negative terminal of said induction coil set through one of said axles and a single insulated conductor which passes through an aperture in the other said axle.

* * * * *